US008256124B2

United States Patent
Su et al.

(10) Patent No.: US 8,256,124 B2
(45) Date of Patent: Sep. 4, 2012

(54) TILT SENSOR

(75) Inventors: Chao Hsuan Su, New Taipei (TW); Chin Chia Hsu, New Taipei (TW)

(73) Assignee: Everlight Electronics Co., Ltd., New Taipei (TW)

( * ) Notice: Subject to any disclaimer, the term of this patent is extended or adjusted under 35 U.S.C. 154(b) by 0 days.

(21) Appl. No.: 13/116,694

(22) Filed: May 26, 2011

(65) Prior Publication Data

US 2012/0144683 A1 Jun. 14, 2012

(30) Foreign Application Priority Data

Dec. 10, 2010 (TW) .............................. 99143379 A

(51) Int. Cl.
*G01C 9/06* (2006.01)
(52) U.S. Cl. .................................................. 33/366.11
(58) Field of Classification Search ............... 33/366.11, 33/366.16, 366.23
See application file for complete search history.

(56) References Cited

U.S. PATENT DOCUMENTS

| 7,161,138 B2 * | 1/2007 | Hsu ............................. 33/366.23 |
| 7,845,086 B2 * | 12/2010 | Makimura ................. 33/366.16 |
| 2002/0189116 A1 * | 12/2002 | Yang et al. ................. 33/366.23 |
| 2009/0293296 A1 | 12/2009 | Mukimura |
| 2010/0000104 A1 | 1/2010 | Mollmer et al. |
| 2010/0101103 A1 * | 4/2010 | Horio et al. ................ 33/366.23 |
| 2011/0072674 A1 * | 3/2011 | Lai .............................. 33/366.23 |

OTHER PUBLICATIONS

U.S. Appl. No. 29/366,780, filed Jul. 29, 2010; inventors: Wu, Wei-Ting; Huang, Wen-Chieh; Hsiao, Yao-Wen.

* cited by examiner

*Primary Examiner* — G. Bradley Bennett
(74) *Attorney, Agent, or Firm* — Han IP Law PLLC; Andy M. Han

(57) ABSTRACT

A tilt sensor comprises a multi-layer circuit board, a holder, a first light-sensing component, a second light-sensing component, a light-emitting component, and a movable component. The multi-layer circuit board comprises a first layer board and a second layer board disposed on the first layer board. The second layer board comprises first, second, and third holding spaces each of which exposing a respective portion of the first layer board. The holder is disposed on the second layer board and has a containing recess connecting the first, second, and third holding spaces. A bottom surface of the containing recess is reflective. The first and second light-sensing components and the light-emitting component are disposed on the first layer board and in the first, second, and third holding spaces, respectively. The light-emitting component emits a light beam toward the bottom surface of the containing recess. The movable component is disposed in the containing recess.

23 Claims, 5 Drawing Sheets

TILT SENSOR

CROSS-REFERENCE TO RELATED APPLICATIONS

This application claims priority to Taiwan Patent Application No. 099143379, entitled "Tilt Sensor", filed on Dec. 10, 2010, which is herein incorporated in its entirety by reference.

BACKGROUND

1. Technical Field

The present disclosure relates to a sensor. More particularly, the present disclosure relates to a tilt sensor.

2. Description of Related Art

Generally speaking, the tilt sensors available on the market are bi-directional sensing, meaning they can only sense two tilting directions, and they tend to be relatively large in size. Given increasing demand for light weight and compactness in the design of consumer electronics, such as mobile phones, it is difficult to fulfill such demand with conventional tilt sensors. If quad-directional sensing is desirable, to sense tilting in the four directions of up, down, left and right, then two bi-directional tilt sensors are used. However, such implementation would make it very difficult to achieve the goals of lower cost, reduced size, and shorter manufacturing process.

In conventional tilt sensors, light-sensing components and light-emitting components are typically die attached to a first circuit board. A holder having a respective containing recess on each of two main sides are disposed on the first circuit board, with the light-sensing component and light-emitting components received in the containing recess of a first side of the holder. To complete the structure of a conventional tilt sensor, a light blocking component is received in the containing recess of a second side of the holder and a second circuit board is disposed on the second side of the holder. The second circuit board reflects light beams from the light-emitting component to the light-sensing component. As such, it is difficult and inconvenient to align and package the first circuit board, the holder, and the second circuit board.

In view of the above, there is a need to provide a tilt sensor that is compact in size with low cost and relatively easier to align and package during the manufacturing process.

SUMMARY

The present disclosure provides a tilt sensor that has the merits of compactness in size, low cost, and relative ease in alignment and packaging during the manufacturing process.

In one aspect, a tilt sensor may comprise a multi-layer circuit board, a holder, a first light-sensing component, a second light-sensing component, a light-emitting component and a movable component. The multi-layer circuit board may comprise a first layer board and a second layer board disposed on the first layer board. The second layer board may have a first holding space, a second holding space, and a third holding space each of which exposing a respective portion of the first layer board. The holder may be disposed on the second layer board and covering the first holding space, the second holding space, and the third holding space. The holder may have a containing recess connecting the first holding space, the second holding space, and the third holding space. A bottom surface of the containing recess may be a reflective surface. The first light-sensing component may be disposed on the first layer board and in the first holding space. The second light-sensing component may be disposed on the first layer board and in the second holding space. The light-emitting component, disposed on the first layer board and in the third holding space, may emit a light beam toward the bottom surface of the containing recess. The movable component may be disposed in the containing recess of the holder such that the movable component moves in a given direction when the tilt sensor tilts in the given direction to either block the light beam emitted by the light-emitting component or cause the light beam to be reflected by the bottom surface of the containing recess to be sensed by at least one of the first light-sensing component and the second light-sensing component.

In one embodiment, an opening of the first holding space, the second holding space, and the third holding space may be smaller than a size of the movable component.

In one embodiment, when the given direction is a first direction, the movable component may move in the first direction and block the first holding space to cause the light beam emitted by the light-emitting component to be reflected by the bottom surface of the containing recess and sensed by the second light-sensing component.

In one embodiment, when the given direction is a second direction, the movable component may move in the second direction and block the second holding space to cause the light beam emitted by the light-emitting component to be reflected by the bottom surface of the containing recess and sensed by the first light-sensing component.

In one embodiment, when the given direction is a third direction, the movable component may move in the third direction and block the third holding space to cause the light beam emitted by the light-emitting component to be blocked by the movable component and not reflected by the bottom surface of the containing recess.

In one embodiment, when the given direction is a fourth direction, the movable component may move in the fourth direction to cause the light beam emitted by the light-emitting component to be reflected by the bottom surface of the containing recess and sensed by at least one of the first light-sensing component and the second light-sensing component.

In one embodiment, the containing recess may comprise a generally rectangular containing recess having four corners with the light-emitting component, the first light-sensing component and the second light-sensing component corresponding to three of the four corners. The movable component may move to one of the four corners when the movable component moves in the given direction.

In one embodiment, the tilt sensor may further comprise a light-reflecting material disposed on the bottom surface of the containing recess to provide a reflective surface.

In one embodiment, a material of the holder may comprise a light-reflecting material or a plastic material. When the material of the holder comprises a plastic material, the tilt sensor may further comprise an anti-electrostatic material disposed on a surface of the containing recess.

In one embodiment, a material of the movable component may comprise a metallic material or an electrically-insulating material.

In one embodiment, a material of the movable component may comprise a light-blocking material.

In one embodiment, the first light-sensing component and the second light-sensing component each may comprise a photodiode or a phototransistor.

In one embodiment, the light-emitting component may comprise a top-emitting light-emitting diode, and the light beam may comprise an infrared light beam.

In one embodiment, the first light-sensing component, the second light-sensing component, and the light-emitting component may be die attached to the first layer board and electrically coupled to the first layer board.

In another aspect, a tilt sensor may comprise a circuit board, a holder, and a movable component. The circuit board may have a plurality of holding spaces each of which disposed in a respective direction on the circuit board and containing a light-emitting component or a respective one of a plurality of light-sensing components where the light-emitting component may be configured to emit a light beam. The holder may be disposed over the plurality of holding spaces and may have a containing recess that connects the holding spaces. A bottom surface of the containing recess may be a reflective surface. The movable component may be disposed in the containing recess such that the movable component moves in a given direction of four directions when the tilt sensor tilts in the given direction to either block the light-emitting component and the light-sensing components or cause the light beam emitted by the light-emitting component to be reflected by the bottom surface of the containing recess to be sensed by at least one of the light-sensing components.

In one embodiment, the circuit board may comprise a multi-layer circuit board that comprises a first layer board and a second layer board. The second layer board may be disposed on the first layer board and may comprise a first holding space, a second holding space, and a third holding space where each of the first, second and third holding spaces may expose a respective portion of the first layer board.

In one embodiment, the second layer board may comprise: a first light-sensing component disposed on the first layer board and in the first holding space; a second light-sensing component disposed on the first layer board and in the second holding space; and a light-emitting component, disposed on the first layer board and in the third holding space, that emits a light beam toward the bottom surface of the containing recess.

In one embodiment, an opening of the first holding space, the second holding space, and the third holding space may be smaller than a size of the movable component.

In one embodiment, when the given direction is a first direction, the movable component may move in the first direction and block the first holding space to cause the light beam emitted by the light-emitting component to be reflected by the bottom surface of the containing recess and sensed by the second light-sensing component.

In one embodiment, when the given direction is a second direction, the movable component may move in the second direction and block the second holding space to cause the light beam emitted by the light-emitting component to be reflected by the bottom surface of the containing recess and sensed by the first light-sensing component.

In one embodiment, when the given direction is a third direction, the movable component may move in the third direction and block the third holding space to cause the light beam emitted by the light-emitting component to be blocked by the movable component and not reflected by the bottom surface of the containing recess.

In one embodiment, when the given direction is a fourth direction, the movable component may move in the fourth direction to cause the light beam emitted by the light-emitting component to be reflected by the bottom surface of the containing recess and sensed by at least one of the first light-sensing component and the second light-sensing component.

In one embodiment, the containing recess may comprise a generally rectangular containing recess having four corners with the light-emitting component, the first light-sensing component and the second light-sensing component corresponding to three of the four corners. The movable component may move to one of the four corners when the movable component moves in the given direction.

In one embodiment, the first light-sensing component and the second light-sensing component may each comprise a photodiode or a phototransistor.

In one embodiment, the light-emitting component may comprise a top-emitting light-emitting diode, and the light beam may comprise an infrared light beam.

In one embodiment, the first light-sensing component, the second light-sensing component, and the light-emitting component may be die attached to the first layer board and electrically coupled to the first layer board.

In one embodiment, the tilt sensor may further comprise a light-reflecting material disposed on the bottom surface of the containing recess to provide a reflective surface.

In one embodiment, a material of the holder may comprise a light-reflecting material or a plastic material. When the material of the holder comprises a plastic material, the tilt sensor may further comprise an anti-electrostatic material disposed on a surface of the containing recess.

In one embodiment, a material of the movable component may comprise a metallic material or an electrically-insulating material.

In one embodiment, a material of the movable component may comprise a light-blocking material.

These and other features, aspects, and advantages of the present disclosure will be explained below with reference to the following figures. It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF PREFERRED EMBODIMENTS

The above-mentioned techniques and other techniques of the present disclosure, their characteristics and effects are described below with reference to the figures. In the disclosed embodiments, terms related to directions such as "up", "down", "left" and "right" are relative to the orientation in the figures. Accordingly, such directional terms are for illustrative purposes and shall not be used to limit the scope of the present disclosure.

Figure 1A:
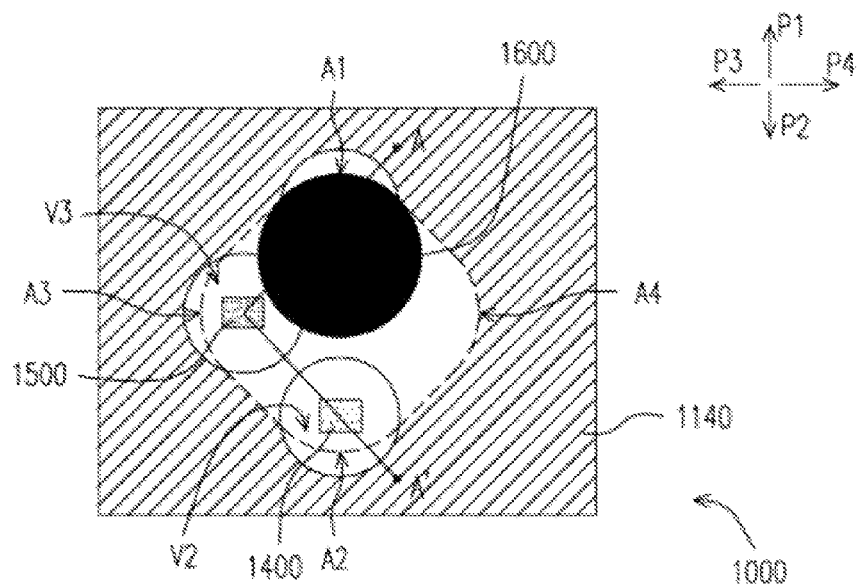
FIGS. 1A, 2A, 3A and 4A each respectively illustrates a tilt sensor sensing a respective tilting direction in accordance with an embodiment of the present disclosure.
Figure 1B:
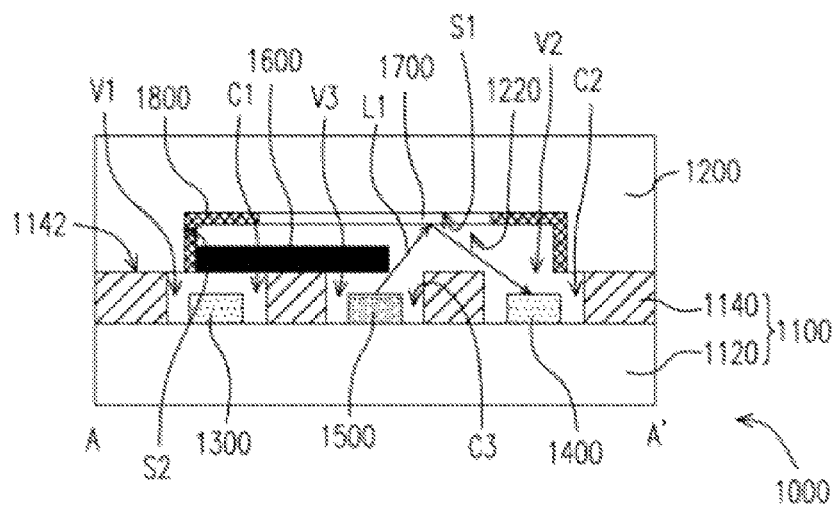
FIGS. 1B, 2B, 3B and 4B each respectively illustrates a cross-sectional view of the tilt sensor along line AA' in accordance with an embodiment of the present disclosure.

FIGS. 1A, 2A, 3A and 4A each respectively illustrates a tilt sensor sensing a respective tilting direction in accordance with an embodiment of the present disclosure. FIGS. 1B, 2B, 3B and 4B each respectively illustrates a cross-sectional view of the tilt sensor along line AA' in accordance with an embodiment of the present disclosure. Referring to FIGS. 1A and 1B, a tilt sensor 1000 according to an embodiment comprises a multi-layer circuit board 1100, a holder 1200, a first light-sensing component 1300, a second light-sensing component 1400, a light-emitting component 1500 and a movable component 1600. The multi-layer circuit board 1100 comprises a first layer board 1120 and a second layer board 1140 that is disposed on the first layer board 1120.

In one embodiment, the second layer board 1140 comprises a first holding space V1, a second holding space V2 and a third holding space V3 each of which exposing a respective portion of the first layer board 1120. The first holding space V1, the second holding space V2 and the third holding space V3 provide holding spaces C1, C2 and C3 on a surface 1142 of the second layer board 1140 of the multi-layer circuit board 1100. The holding spaces C1, C2 and C3 respectively contain the first light-sensing component 1300, the second light-sensing component 1400 and the light-emitting component 1500, as shown in FIG. 1B. The depth H1 of the first holding space V1, the second holding space V2 and the third holding space V3 is greater than the overall thickness of the first light-sensing component 1300, the second light-sensing component 1400 and the light-emitting component 1500. Accordingly, the first light-sensing component 1300, the second light-sensing component 1400 and the light-emitting component 1500 are not exposed outside of the surface 1142 of the second layer board 1140 when contained in the holding spaces C1, C2 and C3, respectively.

Referring to FIGS. 1A and 1B, the holder 1200 is disposed on the second layer board 1140 and covers the first holding space V1, the second holding space V2 and the third holding space V3. The holder 1200 comprises a containing recess 1220 that connects the first holding space V1, the second holding space V2 and the third holding space V3 to one another. In other words, the holding spaces C1, C2 and C3 are connected to the containing recess 1220. In one embodiment, the containing recess 1220 is a generally rectangular containing recess with four corners A1, A2, A3 and A4. The light-emitting component 1500, the first light-sensing component 1300 and the second light-sensing component 1400 correspond to three of the four corners A1, A2, A3 and A4, as shown in FIG. 1A. More specifically, although the containing recess 1220 may be generally rectangular in shape, the corners A1, A2, A3 and A4 may not necessarily be right-angle corners and, rather, may comprise arcs as shown in FIG. 1A to better suit the contour curvature of the movable component 1600.

In one embodiment, a bottom surface S1 of the containing recess 1220 comprises a reflective surface. For example, the tilt sensor 1000 may comprise a light-reflecting material 1700 which may be disposed on the bottom surface S1 of the containing recess 1220 to form the reflective surface, as shown in FIG. 1B. In one embodiment, the light-reflecting material 1700 comprises a metallic or non-metallic material with good light reflectivity. In the case that the light-reflecting material 1700 comprises a metallic material, the metallic material may be gold or silver. In another embodiment, there is no need to utilize the light-reflecting material 1700 in the event that the material of the holder 1200 is a light-reflecting material. Actual implementation can be flexibly designed to suit a user's needs.

Still referring to FIGS. 1A and 1B, the first light-sensing component 1300, the second light-sensing component 1400 and the light-emitting component 1500 are die attached as well as electrically coupled to the first layer board 1120. The first light-sensing component 1300, the second light-sensing component 1400 and the light-emitting component 1500 are respectively disposed in the first holding space V1, the second holding space V2 and the third holding space V3. Specifically, the light-emitting component 1500 is situated to emit a light beam L1 toward the bottom surface S1 of the containing recess 1220 which is situated to reflect the light beam L1. In one embodiment, the first light-sensing component 1300 and the second light-sensing component 1400 are each a photodiode or a phototransistor, and the light-emitting component 1500 is a top-emitting light-emitting diode. The light beam L1 may be an infrared light beam. In other words, the light-emitting component 1500, the first light-sensing component 1300 and the second light-sensing component 1400 may each face the bottom surface S1 of the containing recess 1220, allowing the light beam L1 to be reflected to the first light-sensing component 1300 and the second light-sensing component 1400 from the bottom surface S1.

Moreover, the movable component 1600 is disposed in the containing recess 1220, as shown in FIGS. 1A and 1B. In one embodiment, when the tilt sensor 1000 tilts in a particular tilting direction (e.g., a first direction P1, a second direction P2, a third direction P3 or a fourth direction P4), the movable component 1600 in the containing recess 1220 moves in the tilting direction which, in turn, either blocks the light beam L1 emitted from the light-emitting component 1500 directly or causes the light beam L1 emitted from the light-emitting component 1500 to be reflected to at least one of the first light-sensing component 1300 and the second light-sensing component 1400. More detailed description related to the operation of the tilt sensor 1000 will be provided later.

In one embodiment, the material of the movable component 1600 comprises a light-blocking material which may be a metallic or electrically-insulating material. Preferably, the movable component 1600 comprises a heavy material so that it can be better influenced by the gravity. Actual implementation of the material can depend on the specific needs and design of a user. Furthermore, an opening O1 of the first holding space V1, the second holding space V2 and the third holding space V3 is smaller than the size of the movable component 1600. Accordingly, the first holding space V1, the second holding space V2 or the third holding space V3 can be completely blocked when the movable component 1600 moves to the first holding space V1, the second holding space V2 and the third holding space V3.

When the material of the holder 1200 is a plastic material, due to gradual shrinkage of the tilt sensor 1000 over time, electrostatic force from the containing recess 1220 may become a more significant influence on the movable component 1600 than the gravity even to the point that sensitivity and accuracy of the tilt sensor 1000 may be compromised. In one embodiment, the material of the tilt sensor 1000 may additionally or alternatively comprise an anti-electrostatic material 1800 disposed on a surface S2 of the containing recess 1220 in order to reduce attractive force on the movable component 1600 due to electrostatics.

FIGS. 1A, 2A, 3A and 4A each illustrates a situation where the tilt sensor 1000 is placed on a horizontal plane and tilted in a respective direction to cause the movable component 1600 to move to a respectively different position. FIGS. 1B, 2B, 3B and 4B each illustrates a cross-sectional view of the tilt sensor 1000 of FIGS. 1A, 2A, 3A and 4A, respectively, along the line AA'. Specifically, when the tilt sensor 1000 is tilted in the first direction P1, the movable component 1600 in the containing recess 1220 tends to move in the first direction P1 to cover up the first holding space V1. Consequently the light beam L1 from the light-emitting component 1500 is reflected by the bottom surface S1 of the containing recess 1220 to the second holding space V2 and sensed by the second light-sensing component 1400, as shown in FIG. 1B. In particular, when the movable component 1600 moves in the first direction P1 in the containing recess 1220, the movable component 1600 tends to move to corner A1. The corners A1, A2, A3 and A4 have curved contours, as shown in FIG. 1A, that complement the contour curvature of the movable component 1600. As the movable component 1600 moves in the first direction P1, the movable component 1600 covers up the first holding space V1. This prevents light beam L1 reflected by the bottom surface S1 from being sensed by the first light-sensing component 1300 but allows the light beam L1 to be sensed by the second light-sensing component 1400, as shown in FIG. 1B. In other words, when the tilt sensor 1000 is tilted in the first direction P1, it is the second light-sensing component 1400 that senses the light beam L1 emitted by the light-emitting component 1500.

Figure 2A:
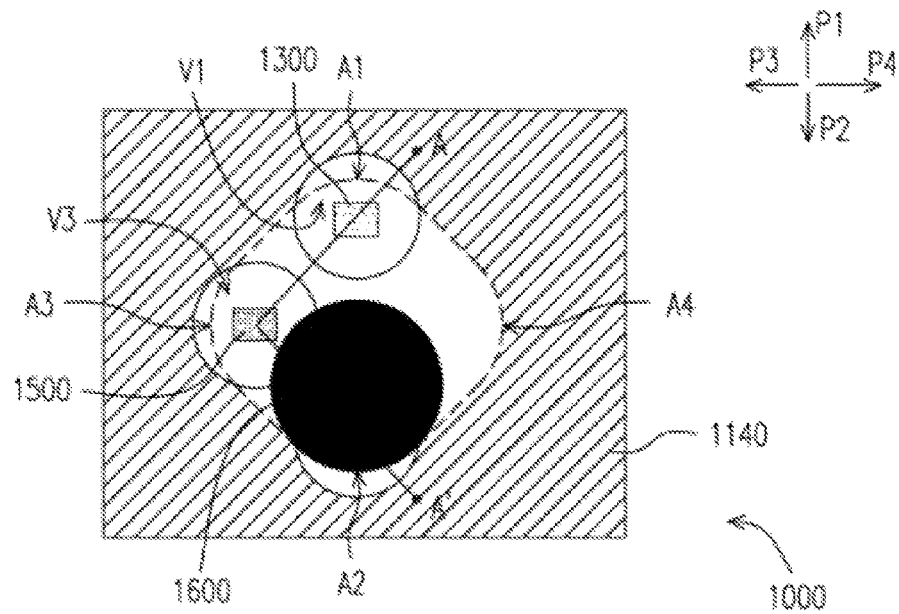
Figure 2B:
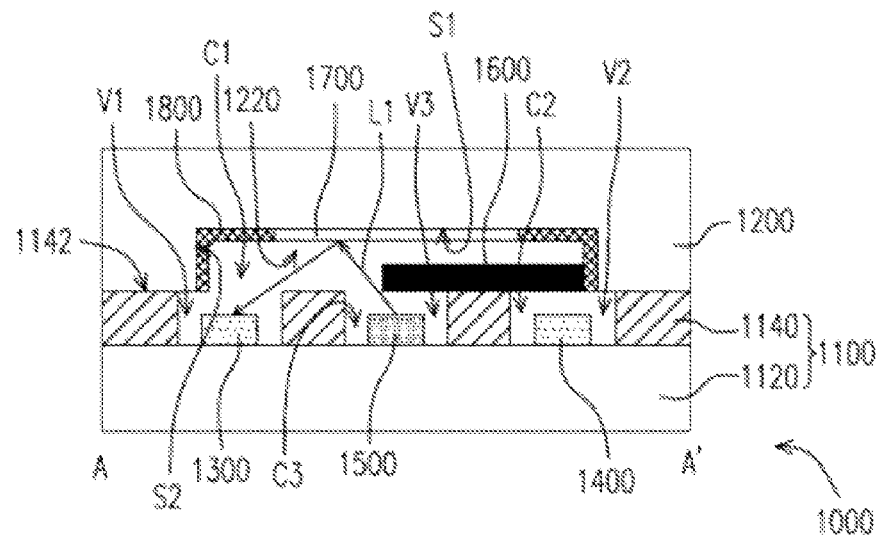

Likewise, when the tilt sensor 1000 is tilted in the second direction P2, the movable component 1600 in the containing recess 1220 tends to move in the second direction P2 to cover up the second holding space V2, as shown in FIGS. 2A and 2B. Consequently, the light beam L1 as reflected by the bottom surface S1 of the containing recess 1220 enters the first holding space V1 to be sensed by the first light-sensing component 1300, as shown in FIG. 2B. In particular, when the movable component 1600 moves in the second direction P2 in the containing recess 1220, the movable component 1600 tends to move to corner A2. The corners A1, A2, A3 and A4 have curved contours, as shown in FIG. 2A, that complement the contour curvature of the movable component 1600. As the movable component 1600 moves in the second direction P2, the movable component 1600 covers up the second holding space V2. This prevents light beam L1 reflected by the bottom surface S1 from being sensed by the second light-sensing component 1400 but allows the light beam L1 to be sensed by the first light-sensing component 1300, as shown in FIG. 2B. In other words, when the tilt sensor 1000 is tilted in the second direction P2, it is the first light-sensing component 1300 that senses the light beam L1 emitted by the light-emitting component 1500.

Figure 3A:
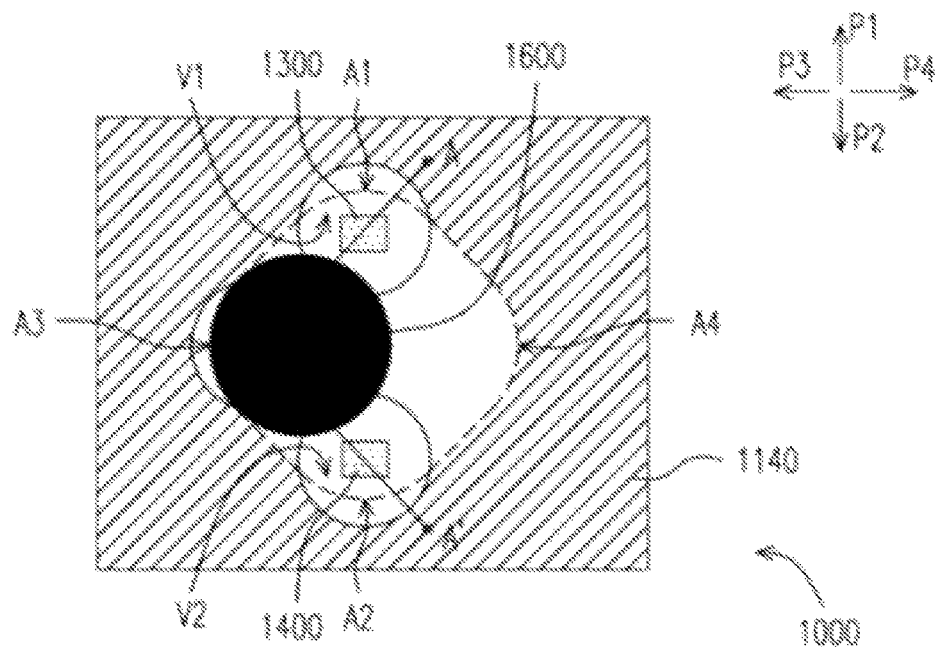
Figure 3B:
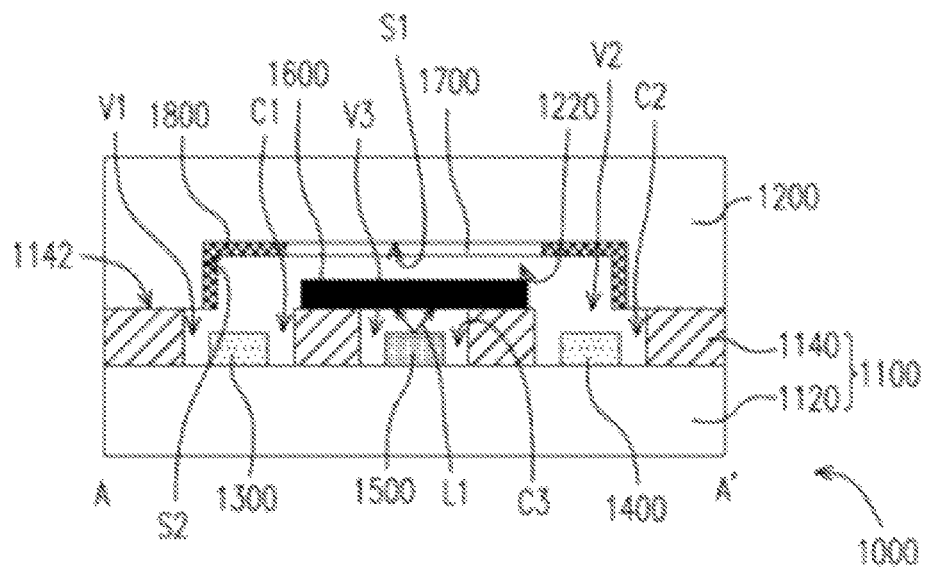

Similarly, when the tilt sensor 1000 is tilted in the third direction P3, the movable component 1600 in the containing recess 1220 tends to move in the third direction P3 to cover up the third holding space V3, as shown in FIGS. 3A and 3B. Consequently, the light beam L1 emitted by the light-emitting component 1500 in the third holding space V3 cannot reach the bottom surface S1 of the containing recess 1220, as shown in FIG. 3B. In particular, when the movable component 1600 moves in the third direction P3 in the containing recess 1220, the movable component 1600 tends to move to corner A3. The corners A1, A2, A3 and A4 have curved contours, as shown in FIG. 3A, that complement the contour curvature of the movable component 1600. As the movable component 1600 moves in the third direction P3, the movable component 1600 covers up the third holding space V3. This prevents light beam L1 emitted by the light-emitting component 1500 from being emitted out of the third holding space V3, as shown in FIG. 3B. In other words, when the tilt sensor 1000 is tilted in the third direction P3, the first light-sensing component 1300 and the second light-sensing component 1400 cannot sense the light beam L1 emitted by the light-emitting component 1500.

Figure 4A:
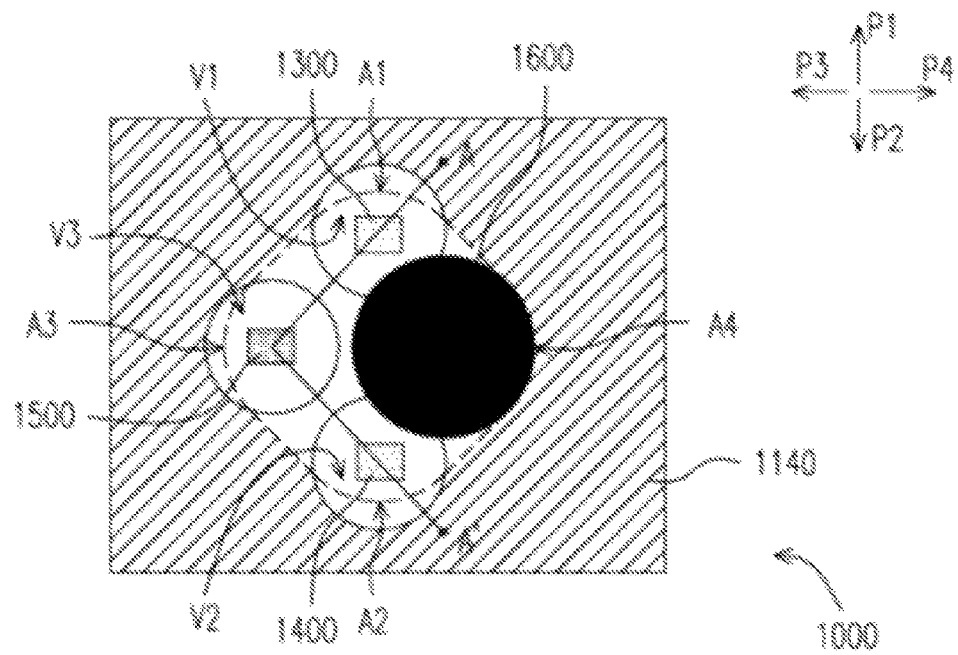
Figure 4B:
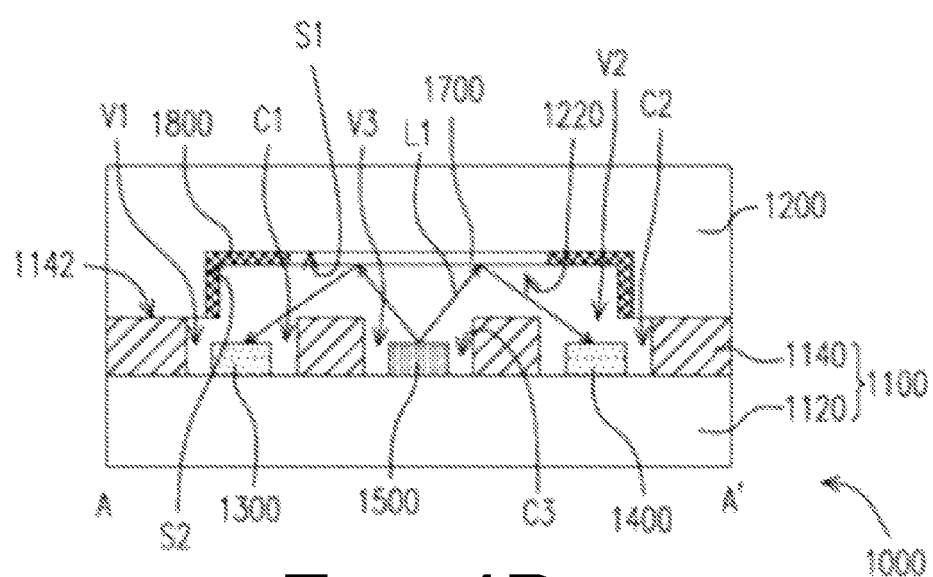

Further, when the tilt sensor 1000 is tilted in the fourth direction P4, the movable component 1600 in the containing recess 1220 tends to move in the fourth direction P4 to allow the light beam L1 emitted by the light-emitting component 1500 to be reflected by the bottom surface S1 of the containing recess 1220 and sensed by at least one of the first light-sensing component 1300 and the second light-sensing component 1400, as shown in FIG. 4B. In particular, when the movable component 1600 moves in the fourth direction P4 in the containing recess 1220, the movable component 1600 tends to move to corner A4. As the first holding space V1, the second holding space V2 and the third holding space V3 are not covered by the movable component 1600, the light beam L1 can reach the bottom surface S1 and be reflected to reach the first light-sensing component 1300 and the second light-sensing component 1400, as shown in FIG. 4B. In other words, when the tilt sensor 1000 is tilted in the fourth direction P4, the first light-sensing component 1300 and the second light-sensing component 1400 can both sense the light beam L1 emitted by the light-emitting component 1500. It follows that the direction in which the tilt sensor 1000 is tilted can be determined based on the status of the sensing of the light beam L1 by the first light-sensing component 1300 and the second light-sensing component 1400.

It is worth noting that, the above description of the tilt sensor 1000 is in the context of having the tilt sensor 1000 placed on a horizontal plane and tilted in a given direction. However, the tilt sensor 1000 according to the present disclosure may also sense vertically rotational directions, such as the function of sensing up and down in a digital camera. As an example, in the state as shown in FIG. 2A, it can be seen that the tilt sensor 1000 is placed on a vertical plane. As the tilt sensor 1000 is influenced by the gravity, the movable component 1600 covers up the second holding space V2 and it is the second light-sensing component 1400 that senses the light beam L1. This allows the determination that such direction is the vertical direction. If the tilt sensor 1000 is turned clockwise 90°, 180°, 270° along a direction parallel to the vertical direction, the movable component 1600 will sequentially move and result in a different state as shown in FIG. 4A, FIG. 1A and FIG. 3A. Accordingly, under different states, different light sensing combinations by the first light-sensing component 1300 and the second light-sensing component 1400 will result, and thus a user can determine the rotational state the tilt sensor 1000 is in based on the light sensing situation with respect to the first light-sensing component 1300 and the second light-sensing component 1400.

Figure 5A:
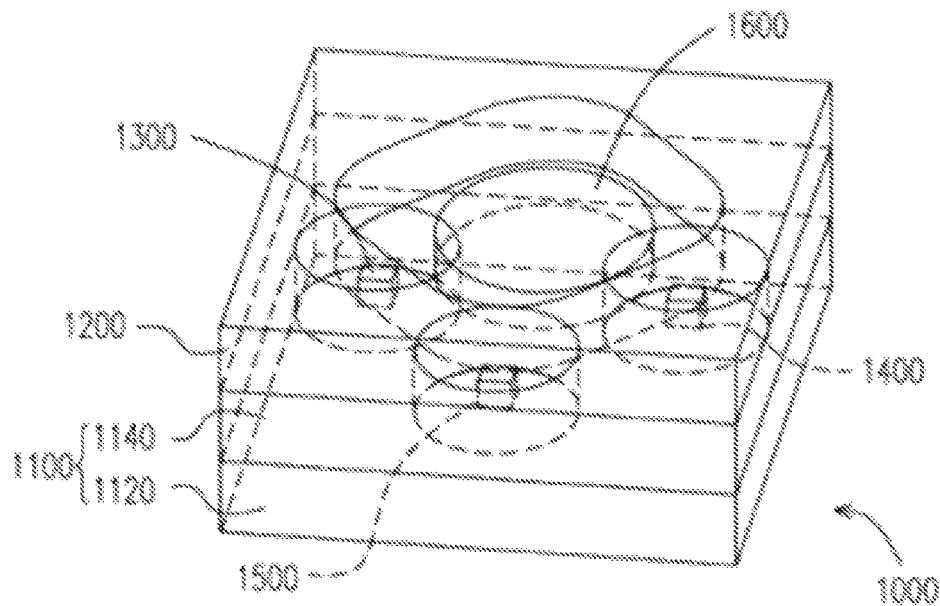
FIG. 5A illustrates a three-dimensional view of a tilt sensor in accordance with an embodiment of the present disclosure.
Figure 5B:
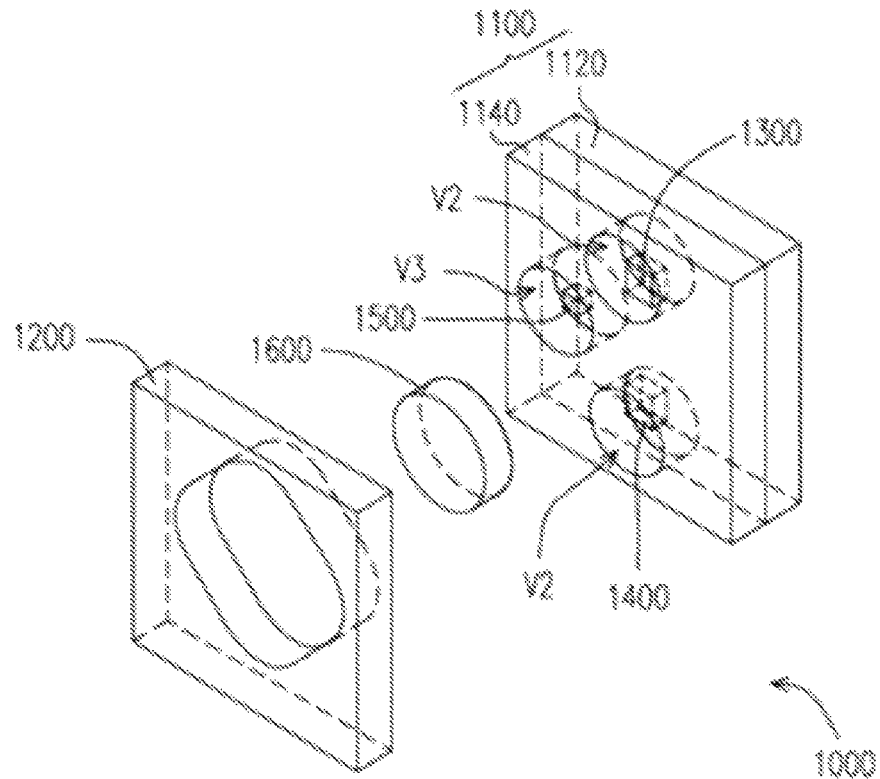
FIG. 5B illustrates an exploded view of the tilt sensor of FIG. 5A.

FIG. 5A illustrates a three-dimensional view of a tilt sensor in accordance with an embodiment of the present disclosure. FIG. 5B illustrates an exploded view of the tilt sensor of FIG. 5A. Referring to FIGS. 5A and 5B, a concrete example of a tilt sensor may comprise, for example, assembling the multi-layer circuit board 1100 having disposed thereon the first light-sensing component 1300, the second light-sensing component 1400 and the light-emitting component 1500 with the movable component 1600 and the holder 1200, to form the tilt sensor 1000 as shown in FIG. 5A or FIG. 1B. The tilt sensor 1000 of the present disclosure utilizes the multi-layer circuit board 1100 (such as having the aforementioned first layer board 1120 and the second layer board 1140) on which the first light-sensing component 1300, the second light-sensing component 1400 and the light-emitting component 1500 are die attached. The first light-sensing component 1300, the second light-sensing component 1400 and the light-emitting component 1500 are disposed in the holding spaces V1, V2 and V3, respectively, of the second layer board 1140. Accordingly, when the movable component 1600 in the containing recess 1220 moves across and over the second layer board 1140, the movable component 1600 does not come in contact with the first light-sensing component 1300, the second light-sensing component 1400 or the light-emitting component 1500. In other words, in the tilt sensor 1000, the second layer board 1140 of the multi-layer circuit board 1100 functions as an insulating layer between the movable component 1600 and the first light-sensing component 1300, the second light-sensing component 1400 and the light-emitting component 1500.

In view of the above description, one of ordinary skill in the art will appreciate the various merits provided by a tilt sensor according to the present disclosure. Firstly, the tilt sensor according to the present disclosure utilizes the second layer board of the multi-layer circuit board as an insulating layer between the movable component and the light-sensing and light-emitting components. This allows the employment of a holder with a containing recess to have the movable component packaged and disposed on the second layer board in the containing recess. That is, the tilt sensor according to the present disclosure does not require two separate circuit boards, thus lowering the manufacturing cost and the precision required in manufacturing process.

Secondly, as the packaging of the tilt sensor according to the present disclosure requires the packing of merely the multi-layer circuit board and the holder containing the movable component, alignment and manufacturing of the tilt sensor according to the present disclosure tend to be easier relative to that of conventional tilt sensors.

Thirdly, with the containing recess being a generally rectangular containing recess, the tilt sensor according to the present disclosure can detect the tilting direction by the movable component moving toward a corresponding corner of the containing recess. This allows the tilt sensor to sense tilting in four directions.

Furthermore, attractive force due to electrostatics is reduced when the containing recess of the tilt sensor contains an anti-electrostatic material. This improves the sensitivity of the tilt sensor.

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. A tilt sensor, comprising:
    a multi-layer circuit board comprising:
        a first layer board; and
        a second layer board disposed on the first layer board, the second layer board having a first holding space, a second holding space, and a third holding space each of which exposing a respective portion of the first layer board;
    a holder disposed on the second layer board and covering the first holding space, the second holding space, and the third holding space, the holder having a containing recess connecting the first holding space, the second holding space, and the third holding space, a bottom surface of the containing recess being a reflective surface;
    a first light-sensing component disposed on the first layer board and in the first holding space;
    a second light-sensing component disposed on the first layer board and in the second holding space;
    a light-emitting component, disposed on the first layer board and in the third holding space, that emits a light beam toward the bottom surface of the containing recess; and
    a movable component disposed in the containing recess of the holder such that the movable component moves in a given direction when the tilt sensor tilts in the given direction to either block the light beam emitted by the light-emitting component or cause the light beam to be reflected by the bottom surface of the containing recess to be sensed by at least one of the first light-sensing component and the second light-sensing component.

2. The tilt sensor of claim 1, wherein an opening of the first holding space, the second holding space, and the third holding space is smaller than a size of the movable component.

3. The tilt sensor of claim 1, wherein, when the given direction is a first direction, the movable component moves in the first direction and blocks the first holding space to cause the light beam emitted by the light-emitting component to be reflected by the bottom surface of the containing recess and sensed by the second light-sensing component, or when the given direction is a second direction, the movable component moves in the second direction and blocks the second holding space to cause the light beam emitted by the light-emitting component to be reflected by the bottom surface of the containing recess and sensed by the first light-sensing component, or when the given direction is a third direction, the movable component moves in the third direction and blocks the third holding space to cause the light beam emitted by the light-emitting component to be blocked by the movable component and not reflected by the bottom surface of the containing recess, or when the given direction is a fourth direction, the movable component moves in the fourth direction to cause the light beam emitted by the light-emitting component to be reflected by the bottom surface of the containing recess and sensed by at least one of the first light-sensing component and the second light-sensing component.

4. The tilt sensor of claim 1, wherein the containing recess comprises a generally rectangular containing recess having four corners with the light-emitting component, the first light-sensing component and the second light-sensing component corresponding to three of the four corners.

5. The tilt sensor of claim 4, wherein the movable component moves to one of the four corners when the movable component moves in the given direction.

6. The tilt sensor of claim 1, further comprising a light-reflecting material disposed on the bottom surface of the containing recess to provide a reflective surface.

7. The tilt sensor of claim 1, wherein a material of the holder comprises a light-reflecting material or a plastic material.

8. The tilt sensor of claim 7, wherein, when the material of the holder comprises a plastic material, the tilt sensor further comprises an anti-electrostatic material disposed on a surface of the containing recess.

9. The tilt sensor of claim 1, wherein a material of the movable component comprises a metallic material, an electrically-insulating material or a light-blocking material.

10. The tilt sensor of claim 1, wherein the first light-sensing component, the second light-sensing component, and the light-emitting component are die attached to the first layer board and electrically coupled to the first layer board.

11. A tilt sensor, comprising:
    a circuit board, the circuit board having a plurality of holding spaces each of which disposed in a respective direction on the circuit board and containing a light-emitting component or a respective one of a plurality of light-sensing components, the light-emitting component configured to emit a light beam;
    a holder disposed over the plurality of holding spaces and having a containing recess that connects the holding spaces, a bottom surface of the containing recess being a reflective surface; and
    a movable component disposed in the containing recess such that the movable component moves in a given direction of four directions when the tilt sensor tilts in the given direction to either block the light-emitting component and the light-sensing components or cause the light beam emitted by the light-emitting component to be reflected by the bottom surface of the containing recess to be sensed by at least one of the light-sensing components.

12. The tilt sensor of claim 11, wherein the circuit board comprises a multi-layer circuit board that comprises a first layer board and a second layer board.

13. The tilt sensor of claim 12, wherein the second layer board is disposed on the first layer board and comprises a first holding space, a second holding space, and a third holding space, each of the first, second and third holding spaces exposing a respective portion of the first layer board.

14. The tilt sensor of claim 13, wherein the second layer board comprises:
   a first light-sensing component disposed on the first layer board and in the first holding space;
   a second light-sensing component disposed on the first layer board and in the second holding space; and
   a light-emitting component, disposed on the first layer board and in the third holding space, that emits a light beam toward the bottom surface of the containing recess.

15. The tilt sensor of claim 14, wherein an opening of the first holding space, the second holding space, and the third holding space is smaller than a size of the movable component.

16. The tilt sensor of claim 14, wherein, when the given direction is a first direction, the movable component moves in the first direction and blocks the first holding space to cause the light beam emitted by the light-emitting component to be reflected by the bottom surface of the containing recess and sensed by the second light-sensing component, or when the given direction is a second direction, the movable component moves in the second direction and blocks the second holding space to cause the light beam emitted by the light-emitting component to be reflected by the bottom surface of the containing recess and sensed by the first light-sensing component, or when the given direction is a third direction, the movable component moves in the third direction and blocks the third holding space to cause the light beam emitted by the light-emitting component to be blocked by the movable component and not reflected by the bottom surface of the containing recess, or when the given direction is a fourth direction, the movable component moves in the fourth direction to cause the light beam emitted by the light-emitting component to be reflected by the bottom surface of the containing recess and sensed by at least one of the first light-sensing component and the second light-sensing component.

17. The tilt sensor of claim 14, wherein the containing recess comprises a generally rectangular containing recess having four corners with the light-emitting component, the first light-sensing component and the second light-sensing component corresponding to three of the four corners.

18. The tilt sensor of claim 17, wherein the movable component moves to one of the four corners when the movable component moves in the given direction.

19. The tilt sensor of claim 14, wherein the first light-sensing component, the second light-sensing component, and the light-emitting component are die attached to the first layer board and electrically coupled to the first layer board.

20. The tilt sensor of claim 11, further comprising a light-reflecting material disposed on the bottom surface of the containing recess to provide a reflective surface.

21. The tilt sensor of claim 11, wherein a material of the holder comprises a light-reflecting material or a plastic material.

22. The tilt sensor of claim 11, wherein the tilt sensor further comprises an anti-electrostatic material disposed on a surface of the containing recess.

23. The tilt sensor of claim 11, wherein a material of the movable component comprises a metallic material, an electrically-insulating material or a light-blocking material.

* * * * *